Patented Apr. 4, 1939

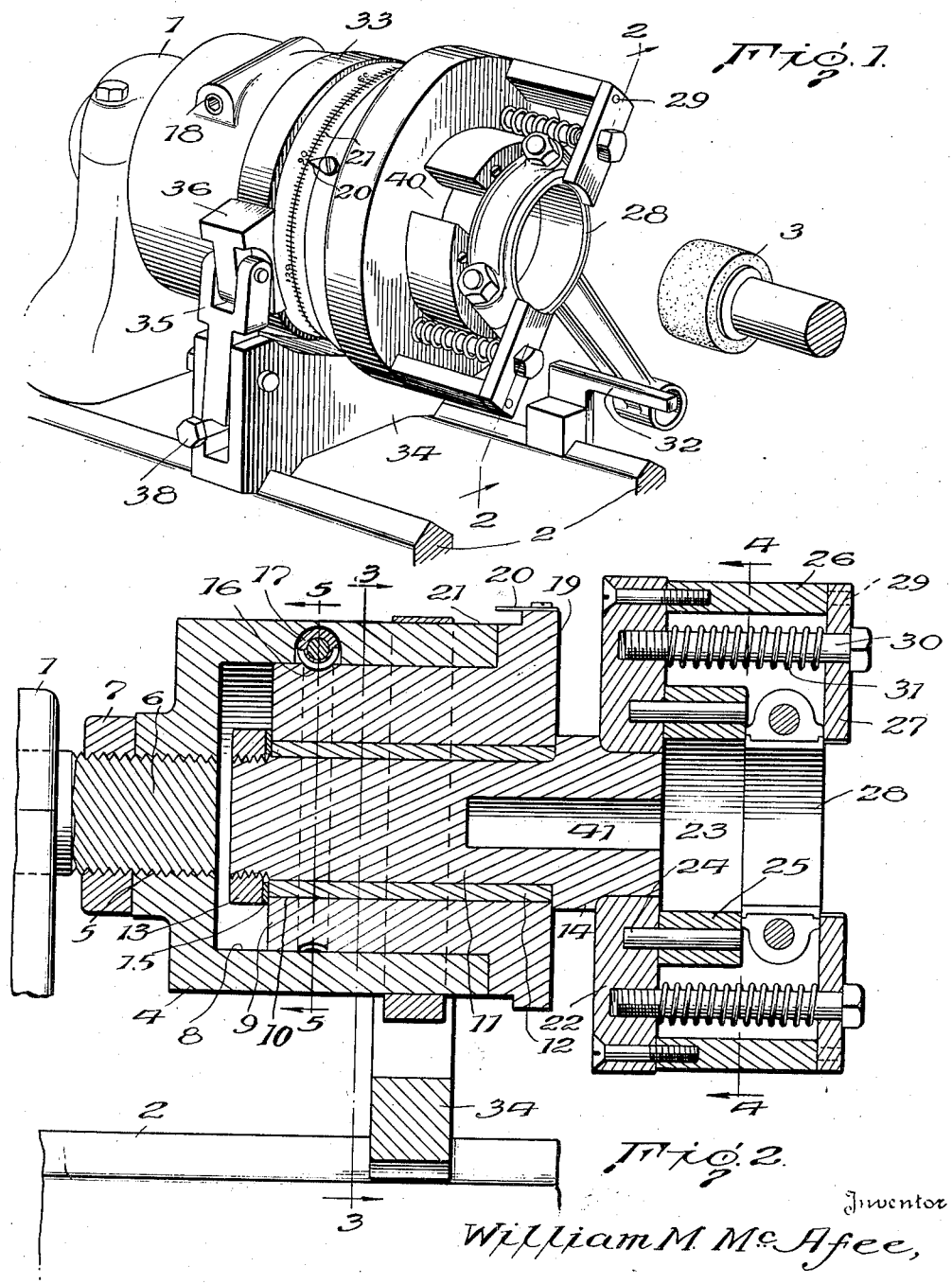

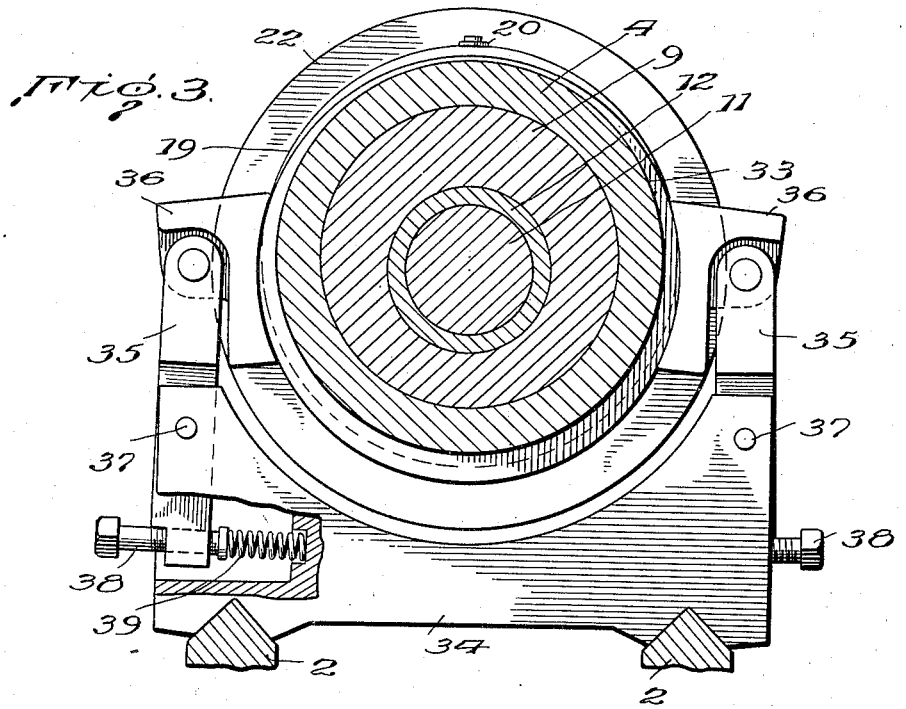
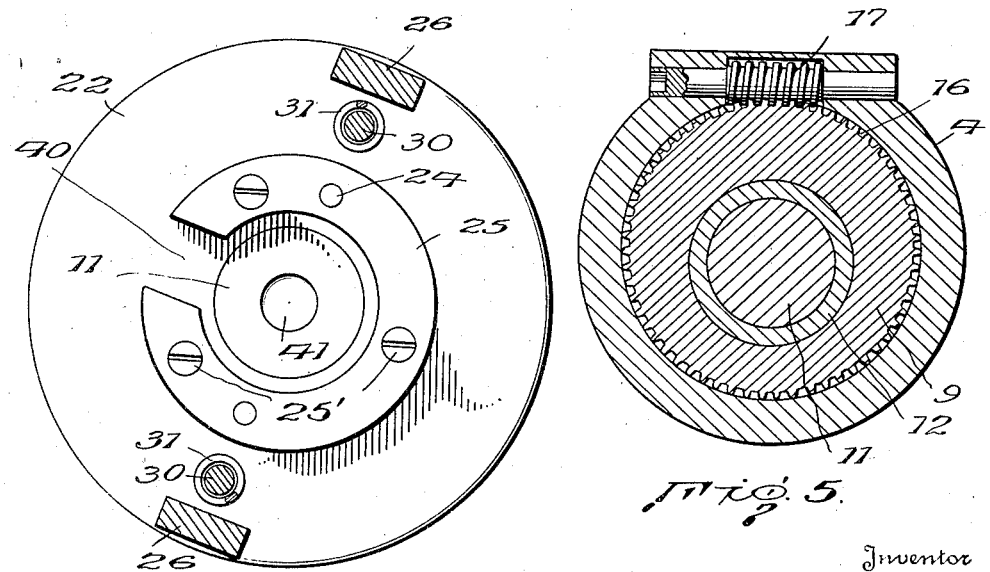

2,153,261

UNITED STATES PATENT OFFICE 2,153,261

WORK HOLDER FOR GRINDING MACHINES

William M. McAfee, Richmond, Va., assignor of one-half to Federal-Mogul Corporation, Detroit, Mich., a corporation of Michigan Application June 14, 1938, Serial No. 213,667

9 Claims. (Cl. 51—237)

This invention relates to a grinding machine and a work holder therefor.

According to the usual method of grinding internal surfaces, the work is clamped in a chuck which rotates at a relatively slow speed, and an eccentrically mounted grinding tool rotating at a relatively high speed is inserted into the opening to be ground and moved laterally until the grinding tool contacts the internal surface of the work as it rotates. The relative rotation between the work and the grinding tool, together with the eccentric mounting of the grinding tool, causes the entire surface of the work to be brought into contact with the grinding tool. Suitable means are provided for advancing the grinding tool laterally of the surface being ground, and also towards the work.

A method of grinding as described above is not entirely satisfactory for grinding relatively large parts, or parts of substantial length in one direction, as for example the crank shaft bearing surface of a connecting rod for an internal combustion engine, as the machine for rotating the chuck must be of sufficient size to permit the entire work to rotate about the center of the opening to be ground as an axis. Furthermore, when the work rotates the overhang tends to throw the work out of center and to destroy the accuracy of the grinding.

The disadvantages of the rotating-chuck type of holder for the work to be ground are overcome by the present invention, while at the same time the effect of rotation of the work about the grinding tool is retained. To that end, the work is clamped in an eccentrically mounted work holder and is restrained from rotating with the work holder so that it will be caused to gyrate about a concentrically-rotating grinding tool, so that all portions of the surface to be ground will be brought into contact with the periphery of the grinding tool, much in the manner as when the work is caused to rotate about an eccentrically-mounted rotating grinding tool.

To permit the work to be set initially so that the internal surface to be ground will contact the periphery of the grinding tool during its gyratory movement, the work holder is mounted on a shaft which is received within an eccentric member which in turn is mounted within and rotates with an eccentric housing which is attached to and rotates with the rotating spindle or the driving member of the grinding machine. A worm and worm gear, or other suitable means, are provided for rotating the inner eccentric member with respect to the eccentric housing. Such means also enables the inner eccentric member to be adjusted angularly with respect to the eccentric housing, so that its eccentricity will neutralize or offset the eccentricity of the eccentric housing, when the shaft which carries the work holding member will be in its zero position with no movement imparted to it during rotation of the eccentric housing, or so that its eccentricity adds to the eccentricity of the eccentric housing when the maximum gyratory movement will be imparted to the shaft which carries the work holding member.

The invention will be further described in connection with the accompanying drawings, but it is to be understood that such further illustration and explanation is solely for the purpose of exemplification and the invention is not to be limited thereto except as it may be defined in the appended claims.

In the drawings:

Fig. 1 is a perspective view of my improved work holder shown secured to the head stock of a lathe, Fig. 2 is a longitudinal sectional view on the line 2—2 of Fig. 1, Fig. 3 is a transverse sectional view on the line 3—3 of Fig. 2, Fig. 4 is a transverse sectional view on the line 4—4 of Fig. 2, and Fig. 5 is a detail view showing the means for adjusting the inner eccentric member with respect to the outer eccentric housing.

The work holder of my invention may be secured to any type of grinding machine having a rotatable driving member, but for purposes of illustration is shown attached to a lathe having a head stock 1, side rails 2 and driving means (not shown) for driving and longitudinally and laterally moving a rotary grinding tool 3.

The work holder comprises a housing 4 having an eccentrically positioned threaded opening 5 for attachment to the rotary driving spindle 6 of the head stock of the lathe. A jam nut 7 holds the housing 4 securely in place on the spindle 6 and prevents any relative movement between the housing and the spindle during the grinding operation.

Both the inner and outer surfaces of the cylindrical wall of the housing are eccentric with respect to the spindle 6, the axis of which is the axis of rotation of the housing. The inner cylindrical surface 8 of the housing provides a bearing surface for an inner bearing member 9 having an eccentrically positioned bore 10 for a stub shaft 11 which has a work holding member or assembly non-rotatably secured to its outer end. A bronze bushing 12 preferably is interposed between the shaft 11 and the inner eccentric member 9. A thrust nut 13 on the inner end of the shaft 11 and a shoulder 14 near the outer end thereof position the shaft within the inner eccentric member 9. A steel thrust washer 15 preferably is interposed between the thrust nut 13 and the inner end of the inner eccentric member 9 and the bronze bushing 12.

The inner eccentric member 9 is rotatable within the housing 4, and in order that its angular position within the housing may be changed to adjust its eccentricity with respect to the eccentricity of the housing, its outer periphery is provided with an annular worm ring 16 which meshes with a worm 17 rotatably mounted in the wall of the housing 4. One end of the worm shaft has a polygonal socket 18 accessible from the outside of the housing to receive a crank or the like for rotating the worm and the worm ring to adjust the angular position of the inner eccentric member 9 with respect to the housing. The outer end of the inner eccentric member 9 has a radially-extending flange 19 which carries an indicator 20 which cooperates with the scale 21 on the outer periphery of the housing to indicate the exact angular position of the inner eccentric member with respect to the housing.

The work holding assembly comprises a face plate 22 non-rotatably secured to the outer end of the stub shaft 11 and having sockets 23 in its outer surface for receiving dowels 24 of a holder plate 25, which may be rigidly secured to the face plate 22 by means of bolts or the like 25'. Clamp heels 26 are bolted or otherwise secured to the face plate 22 adjacent its outer edge and carry hold-down clamps 27 for holding the work, here shown as a connecting rod 28 for an internal combustion engine, against the holder plate 25. The hold-down clamps 27 are mounted on dowels 29 carried by the clamp heels 26 and are held tight against the work by clamp screws threaded into the face plate 22. Springs 31 surround the clamp screws 30 and prevent rattling or chattering of the hold-down clamps when they are not clamped against work.

Suitable means preferably are provided to be engaged by some part of the work holding assembly or the work itself so that the friction between the stub shaft 11 and the bronze bushing will not cause the stub shaft and the work carried thereby to rotate as the housing is rotated. When the work is of the nature of a connecting rod for an internal combustion engine, such means may comprise a guide bar 32 clamped or otherwise secured to one of the rails of the lathe.

In some instance it might be desirable to provide a bearing for the housing 4 to eliminate any vibration thereof. Such a bearing may comprise a ring 33 secured to the outer periphery of the housing. The opening in the ring 33 is eccentric to its outer periphery to the same extent as the outer periphery of the housing 4 is eccentric to its axis of rotation, and the ring is fixed about the housing so that its outer periphery is concentric with the axis of rotation of the housing. A carriage 34 straddles the rails 2 of the lathe and forms a mounting for pivoted yokes 35 having bearing blocks 36 pivoted in their upper ends and bearing against the periphery of the ring 33 as it rotates. The yokes are pivoted at 37 to the carriage 34 and their lower ends carry adjustable tension bolts 38 against which springs 39 act to yieldably force the bearing blocks 36 against the bearing ring 33.

The holder plate 25 has an opening 40 through which a hose or other conduit for conveying water or other fluid medium to the grinding surface may be inserted.

The outer end of the stub shaft 11 has a central bore 41 to receive a part of a jig for accurately centering the work on the holder plate 25 before the hold-down clamps are clamped tightly against the work.

As the housing 4 is eccentric with respect to its axis of rotation, and as the inner eccentric member 9 is rotatably connected to the housing through the worm gear 16 and worm 17, rotation of the spindle 6 will cause the housing 4 and the inner eccentric member 9 to be rotated about the stub shaft 11, due to the fact that the guide bar 32 for the work slidably engages or holds the work, the work holding assembly and the stub shaft against rotation. However, the stub shaft 11 will not remain stationary as the eccentricities of the housing 4 and the inner member 9 within which the stub shaft is mounted will cause a gyratory motion to be imparted to the stub shaft as well as the work carried thereby. Because of the angular adjustability of the inner eccentric member 9 within the housing 4, the gyratory movement imparted to the stub shaft 11 and the work carried thereby may be adjusted from zero, as when the relative angular position of the inner eccentric member 9 to the housing 4 is such that the eccentricity of one offsets the eccentricity of the other, to maximum, as when the relative angular position of the inner eccentric member 9 to the housing 4 is such that the eccentricities of those parts are cumulative.

When a grinding operation is to be performed, the work is clamped within the work holding assembly as described, and the angular position of the inner eccentric member with respect to the housing 4 is adjusted so that the desired gyratory motion will be imparted to the work. The grinding tool is then moved longitudinally along the rails of the lathe until it enters the opening to be ground. It is then moved laterally to bring it into light contact with the surface to be ground. Rotary motion is then imparted to the grinding tool and to the spindle 6, the latter, through the eccentric housing and the inner eccentric member 9 causing the work to gyrate about the grinding tool so that all portions of the internal surface to be ground will be brought into contact with the rotating grinding tool. As the grinding progresses, the grinding tool may be advanced both towards the surface being ground and along said surface in accordance with the usual grinding practice.

From the foregoing description it will be seen that the present work holder retains all of the advantages of the rotating-chuck type of holder, while at the same time the disadvantages of that type of work holder are overcome.

I claim:

1. In a grinding machine, a rotatable driving member, a member secured to said driving member for rotation therewith and having a surface eccentric with respect to the axis of rotation of said driving member, a work-holder-supporting member, carried by the member secured to said driving member, said work-holder-supporting member having an eccentrically positioned bore, a work-holder member mounted within said bore, and means for preventing rotation of said work-holder member with said work-holder-supporting member whereby a gyratory motion will be imparted to the work-holder member and the work carried thereby upon rotation of the driving member.

2. In a grinding machine, a rotatable driving member, a housing secured to said driving member for rotation therewith, said housing having an internal surface eccentric to its axis of rotation, a work-holder-supporting member having an eccentrically positioned bore within said housing, a work-holder member having a supporting stub shaft mounted within said bore, and means for preventing rotation of said work-holder member and work carried thereby upon rotation of said housing.

3. In a grinding machine, a rotatable driving member, a housing secured to said driving member for rotation therewith, said housing having an internal surface eccentric to its axis of rotation, a work-holder-supporting member having an eccentrically positioned bore within said housing and rotatable therewith, a work-holder member having a supporting stub shaft mounted within said bore, and means for preventing rotation of said work-holder member and work carried thereby upon rotation of said housing.

4. In a grinding machine, a rotatable driving member, a housing secured to said driving member for rotation therewith, said housing having an internal surface eccentric to its axis of rotation, a work-holder-supporting member having an eccentrically positioned bore within said housing and rotatable therewith, means for adjusting the angular position of said work-holder-supporting member with respect to said housing to thereby change the relative eccentricity of the bore of said work-holder-supporting member with respect to the axis of rotation of the housing, a work-holder member having a supporting stub shaft mounted within said bore, and means for preventing rotation of said work-holder member and work carried thereby upon rotation of said housing.

5. In a grinding machine, a rotatable driving member, a housing secured to said driving member for rotation therewith, said housing having an internal surface eccentric to its axis of rotation, a work-holder-supporting member having an eccentrically positioned bore within said housing, a worm ring carried by said work-holder-supporting member and a worm gear carried by said housing for adjusting the angular position of said work-holder-supporting member with respect to the housing to change the relative eccentricity of the bore of said work-holder-supporting member with respect to the axis of rotation of the housing, a work-holder member having a supporting stub shaft mounted within said bore, and means for preventing rotation of said work-holder member and work carried thereby upon rotation of said housing.

6. In a grinding machine, a rotatable driving member, a housing secured to said driving member for rotation therewith, said housing having an internal surface eccentric to its axis of rotation, a work-holder-supporting member having an eccentrically positioned bore within said housing, a work-holder member having a supporting stub shaft mounted within said bore, means for preventing rotation of said work-holder member and work carried thereby upon rotation of said housing, a bearing ring carried by the external surface of said housing and having an outer surface concentric with the axis of rotation of said housing, and a bearing for the external surface of said bearing ring.

7. In a grinding machine, a rotatable driving member, a housing secured to said driving member for rotation therewith, said housing having an internal surface eccentric to its axis of rotation, a work-holder-supporting member having an eccentrically positioned bore within said housing, a work-holder member having a supporting stub shaft mounted within said bore, means for preventing rotation of said work-holder member and work carried thereby upon rotation of said housing, a bearing ring carried by the external surface of said housing and having an outer surface concentric with the axis of rotation of said housing, and a bearing yieldably engaging the external surface of said bearing ring.

8. A work-holder for a grinding machine having a rotatable driving member, comprising a housing adapted to be secured to said driving member for rotation therewith, said housing having a bore extending substantially parallel with its axis of rotation and eccentric thereto, a work-holder member supported by said housing and having a supporting stub shaft mounted in the bore thereof, said housing being rotatable about said stub shaft, whereby rotation of said housing will cause a gyratory motion to be imparted to said work-holder member.

9. A work-holder for a grinding machine having a rotatable driving member, comprising a housing adapted to be secured to said driving member for rotation therewith, said housing having a bore extending substantially parallel with its axis of rotation and eccentric thereto, a work-holder-supporting member mounted within the bore of said housing and supported entirely by said housing, said work-holder-supporting member being rotatable with said housing and having an eccentrically positioned bore, means for adjusting the angular position of said work-holder-supporting member with respect to the housing for changing the relative eccentricity of the bore therein with respect to the axis of rotation of the housing, a work-holder member having a supporting stub shaft positioned within the bore of said work-holder-supporting member and supported by said work-holder supporting member and housing, said housing and work-holder-supporting member being rotatable about said stub shaft, whereby rotation of said housing and work-holder-supporting member will cause a gyratory motion to be imparted to said work-holder member.

WILLIAM M. McAFEE.